Dec. 20, 1960  R. W. WILLIAMSON  2,965,074
HYDRAULIC STOP DEVICE
Filed Oct. 29, 1958
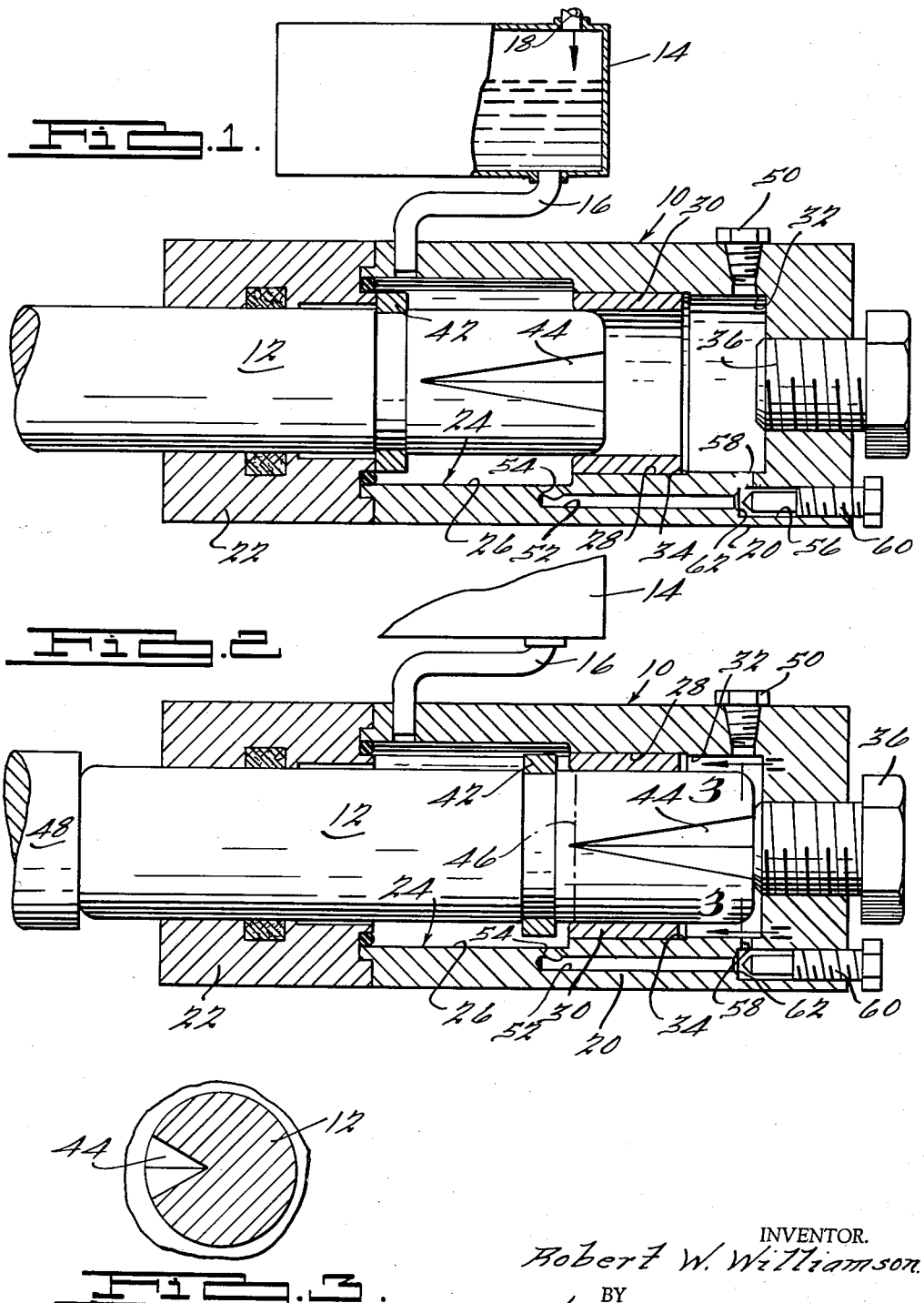
INVENTOR.
Robert W. Williamson
BY
Harness, Dickey & Pierce
ATTORNEYS.

United States Patent Office 2,965,074
Patented Dec. 20, 1960

2,965,074

HYDRAULIC STOP DEVICE

Robert W. Williamson, 35715 Koenig Drive, New Baltimore, Mich., assignor of one-third to O. D. Herron, Grosse Pointe, and one-third to D. A. Hunter, Utica, Mich.

Filed Oct. 29, 1958, Ser. No. 770,453

9 Claims. (Cl. 121—38)

The present invention relates to a hydraulic stop device of the type used to quickly stop rapidly moving masses in a relatively short distance. Devices of this type find important application in machine tools which often must move large parts at high speeds and stop them in short distances. These high speeds, which are desirable in mass production operations, are limited by the need to stop these large and heavy parts without damage to the machine.

It is an object of the present invention to provide an improved hydraulic stop device adapted to stop large masses moving at high speeds in a short distance and minimize the problem of rebound present in many hydraulic stop devices.

It is a further object to provide such an apparatus which is simple in design, economical of manufacture, rugged in construction, and reliable and efficient in operation.

Other and more detailed objects of the present invention will be appreciated by those skilled in the art from a consideration of the following specification, the appended claims, and the accompanying drawings wherein:

Figure 1 is a diagrammatic sectional view of a hydraulic stop device embodying the present invention and showing the condition of the apparatus prior to operation thereof to stop a moving mass;

Figure 2 is a broken view similar to Figure 1 showing the condition of the apparatus at the instant of stopping of the mass; and, Figure 3 is a broken sectional view of the apparatus illustrated in Figure 2, taken substantially along the line 3—3 thereof.

Referring to the drawings, the hydraulic stop device comprises a cylinder housing 10, a piston 12, and a hydraulic reservoir 14, the bottom of which is connected to the interior of the cylinder housing 10 by a hydraulic line 16, and the top of which is connected to a suitable supply of air and under a suitable pressure by the line 18.

The cylinder housing 10 comprises a generally cylindrical main body 20 and a cylinder head 22 suitably secured thereto. The body 20 has a stepped bore 24 including an outer bore portion 26, an intermediate bore portion 28 having a bushing 30, pressed or otherwise suitably mounted therein, and a slightly reduced inner end portion 32 providing a small shoulder 34 providing a positive limit for inward movement of the bushing 30 during the installation thereof. The body 20 also carries an adjustable stop 36 extending into the reduced bore portion 32 axially thereof and threadedly mounted in the body 20.

The piston 12 is cylindrical in shape and of a diameter to have a close sliding fit in the bushing 30 and in the cylinder head 22 through which it extends. An O-ring 38 is mounted in the housing 10 to provide an effective seal between the body 20 and the head 22 and the latter carries a seal 40 through which the piston extends. In spaced relation to its inner end, the piston 12 carries an abutment ring 42 adapted to engage the cylinder head 22 to limit movement of the piston 12 outwardly of the cylinder housing 10. Also, the piston has a tapering V-shaped groove 44 shown in cross section in Figure 3 and formed in the cylindrical surface of the piston 12 and extending longitudinally thereof from the inner end of the piston 12 toward, but stopping short of, the abutment ring 42.

The broken line 46 in Figure 2 represents the line of contact between the bushing 30 at its left-hand end and the piston and it will be noted that the length of the V-groove 44 is such that when the piston is moved fully to the right, as there shown, with its right-hand end against the stop 36, the V-groove extends slightly to the left of the line 46. This permits fluid pressure within the outer bore portion 26 to be transmitted through the V-groove 44 to the inner bore portion 32 where it acts against the inner end of the piston 12. The amount of this pressure depends upon the air pressure applied through the air line 18 to the upper surface of the liquid in the reservoir 14. Since the only function of this pressure is to return the piston 12 from the position illustrated in Figure 2 to the position illustrated in Figure 1, this air pressure need not be large. It has been found, for example, that a piston one and three-quarters inches (1¾") in diameter is returned satisfactorily using an air pressure of fifteen (15) pounds per square inch.

In the preferred embodiment illustrated, a bleeder plug 50 is provided at the high point of the bore portion 32 to enable the bleeding off of air which may be trapped at the right-hand side of the piston 12, as viewed in Figures 1 and 2, in filling the housing 10 with the liquid. Removal of air which may become trapped in this way is necessary to obtaining proper operation of the device.

Also, it has been found that, while the groove 44 may be designed to provide proper operation in stopping a given mass moving at a given speed, it is desirable, in order to render the device flexible, to provide adjustable means providing for flow from the bore portion 32 to the enlarged bore 26 which communicates with the reservoir 14. For this purpose the body 20 has a longitudinally extending passage 52, the inner end of which communicates with the bore portion 26 as indicated at 54. The passage 52 has an enlarged portion 56 which communicates with the bore portion 32 through a short passage 58 which may be aligned with the opening in which the bleeder plug 50 is mounted. A needle valve 60 is mounted in the enlarged portion 56 and adjustable to control the flow past the needle valve seat 62. By proper adjustment of the needle valve 60, the device may be conditioned for the proper stopping of a wide variety of masses and for differing speeds of travel thereof.

In operation, when a mass to be stopped, such as that illustrated at 48 in Figure 2, hits the left-hand end of the piston 12, after it has been returned to the position illustrated in Figure 1, rapid movement of the piston 12 to the right is initiated. This causes displacement of liquid, which fills the interior of the housing 10, from within the bushing 30 and the reduced bore portion 32. During the initial movement the tapering V-groove 44 permits a relatively rapid flow and accordingly, provides relatively less opposition to movement of the piston 12 to the right. It should be noted that the line diagrammatically illustrated at 16, between the cylinder bore portion 26 and the liquid reservoir 14, is preferably of a size such that any pressure build-up in the bore portion 26 is of relatively little effect compared to that in bore portion 32. It will be seen that as the travel of the piston progresses, a progressively smaller orifice is provided by the groove 44 resulting in a progressively increasing resistance to continued movement of the piston to the right. It will be noted that when the mass 48 stops, there will be very little tendency to rebound because the pressure built up in bore position 32 will be immediately dissipated because of the connection of this inner bore portion 32 to the outer bore portion 26 through the V-groove 44 and through the passage 52. The only pressure which continues to act on the piston 12 is that produced by the air pressure and is negligible as a rebound-producing factor.

While only one specific embodiment of the invention has been illustrated and described herein, it will be readily appreciated by those skilled in the art that numerous modifications and changes may be made without departing from the spirit of the present invention.

What is claimed is:

1. A hydraulic stop device comprising a cylinder, a piston movable relative to said cylinder between a first position and a second position, said cylinder co-operating with said piston to define a closed chamber at the inner end of said piston and a second chamber spaced from said first chamber and the volume of which is substantially independent of the position of said piston relative to said cylinder, co-operating means carried by said cylinder and said piston providing communication between said chambers through an orifice the size of which varies with the position of said piston relative to said cylinder to provide a desired resistance to movement of said piston from said first to said second position when said closed chamber is full of liquid, a liquid reservoir, a liquid line connecting said reservoir to said second chamber, and means for applying a predetermined pressure upon the liquid in said reservoir, said cylinder, said piston and said co-operating means being so constructed and arranged that the liquid pressure within said cylinder acts on said piston in all positions thereof to urge said piston toward said first position.

2. A hydraulic stop device as defined in claim 1, wherein said means for applying pressure comprises means for supplying gas under said predetermined pressure to the interior of said reservoir.

3. A hydraulic stop device as defined in claim 1, including an adjustable stop mounted on said cylinder and adapted to engage said piston to provide a positive stop when said piston reaches said second position.

4. A hydraulic stop device as defined in claim 1, wherein said co-operating means is so constructed and arranged that said orifice is not closed in any position of said piston.

5. A hydraulic stop device as defined in claim 1, wherein said co-operating means is constructed and arranged to provide a progressively decreasing size of said orifice as said piston is moved from said first position to said second position.

6. A hydraulic stop device comprising a cylinder housing, a piston extending outwardly of one end of said housing and movable relative thereto between a first withdrawn position and a second advanced position, said housing including means having a close sliding fit with said piston, said housing defining a chamber intermediate said last named means and said one end of said housing and a second chamber at the inner end of said piston, said piston having a groove in its outer surface extending longitudinally thereof and communicating with each of said chambers in all positions of said piston and varying in cross-sectional area, a liquid reservoir, a liquid line connecting said reservoir to said first named chamber, and means effective continuously during operation of said device for applying a predetermined low pressure to the interior of said liquid reservoir.

7. A hydraulic stop device as defined in claim 6, wherein said groove is of V-shape and tapers from a maximum at the inner end of said piston to a minimum at its point of communication with said first named chamber when said piston is in said second position.

8. A hydraulic stop device as defined in claim 1 including adjustable means providing a variable opening through which said chambers communicate.

9. A hydraulic stop device as defined in claim 6 including means defining a passage interconnecting said chambers, and a needle valve adjustable to control the flow through said passage.

References Cited in the file of this patent

UNITED STATES PATENTS

| 845,827 | Steedman | Mar. 5, 1907 |
| 2,366,777 | Farley | Jan. 9, 1945 |
| 2,853,974 | Hewitt | Sept. 30, 1958 |